US011614615B2

(12) United States Patent
Pu et al.

(10) Patent No.: US 11,614,615 B2
(45) Date of Patent: Mar. 28, 2023

(54) CONTROL LOOP FOR STABILIZING A RESONANT FREQUENCY OF A MIRROR OF A LASER BEAM SCANNING DISPLAY

(71) Applicant: MICROSOFT TECHNOLOGY LICENSING, LLC, Redmond, WA (US)

(72) Inventors: Chuan Pu, Foster City, CA (US); Wenjun Liao, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 13 days.

(21) Appl. No.: 17/470,530

(22) Filed: Sep. 9, 2021

(65) Prior Publication Data

US 2021/0405351 A1    Dec. 30, 2021

Related U.S. Application Data

(62) Division of application No. 16/294,628, filed on Mar. 6, 2019, now Pat. No. 11,137,593.

(51) Int. Cl.
G02B 26/08 (2006.01)
G02B 26/10 (2006.01)
G02B 27/01 (2006.01)

(52) U.S. Cl.
CPC ..... G02B 26/0858 (2013.01); G02B 26/0841 (2013.01); G02B 26/105 (2013.01); G02B 27/0172 (2013.01); G02B 2027/014 (2013.01); G02B 2027/0178 (2013.01)

(58) Field of Classification Search
CPC ............ G02B 26/0858; G02B 26/0841; G02B 26/105; G02B 27/0172; G02B 2027/014; G02B 2027/0178; G02B 27/017; G02B 26/101; G02B 26/127; B81B 7/008
See application file for complete search history.

(56) References Cited

U.S. PATENT DOCUMENTS

| 2008/0144154 | A1* | 6/2008 | Asai | G02B 26/0858 |
| | | | | 359/224.1 |
| 2011/0001888 | A1* | 1/2011 | Brown | G09G 3/025 |
| | | | | 345/545 |
| 2019/0020860 | A1* | 1/2019 | McVittie | H04N 9/3135 |

* cited by examiner

Primary Examiner — Kimberly N. Kakalec
(74) Attorney, Agent, or Firm — Scott Y. Shigeta; Newport IP, LLC

(57) ABSTRACT

A laser beam display device that can dynamically control the resonant frequency of a mirror is provided. The increase the reliability of a device by controlling the resonant frequency of a mirror instead of requiring components of a display device to react to changes in the resonant frequency of a mirror. A controller can drive a mirror with an input signal, receive a signal or data indicating a target resonant frequency, and bias the input signal to control the resonant frequency of the mirror. In some embodiments, the controller can also receive a feedback signal from a mirror indicating a current resonant frequency. The controller can also bias the input signal to increase or decrease the current resonant frequency. By dynamically controlling the resonant frequency of a mirror, a device can minimize any difference between the current resonant frequency detected in a feedback signal and the target resonant frequency.

9 Claims, 17 Drawing Sheets

CONTROL LOOP FOR STABILIZING A RESONANT FREQUENCY OF A MIRROR OF A LASER BEAM SCANNING DISPLAY

CROSS-REFERENCE TO RELATED APPLICATION

This application is a division of U.S. patent application Ser. No. 16/294,628, filed Mar. 6, 2019, the content of which application is hereby expressly incorporated herein by reference in its entirety.

BACKGROUND

Some devices generate displayed images by using mirrors to direct a laser beam onto a display region. In such display devices, the mirrors may move over the course of a frame to control the location in the display region toward which the laser beam is directed. The mirrors may be moved using a microelectromechanical systems (MEMS) driver. The MEMS drivers may be driven using a periodic electrical signal.

In such display devices, it is desirable for the MEMS driver to be driven at a frequency close to its resonant frequency. However, due to changes in environmental conditions, wear and tear on display device components, and/or other changes to the display device, the resonant frequency of the MEMS driver may change. Thus, when changes to the resonant frequency occur, the efficiency of the MEMS driver may be reduced due to the MEMS driver being driven at a frequency other than its resonant frequency. Imprecise control of the mirrors due to changes in resonant frequency may result in distortion of the displayed image.

In some existing systems, a number of control loops are required to coordinate in order to detect and accommodate changes in the resonant frequency. For instance, in order for a fast scan (FS) mirror to operate at its resonance, multiple controllers of the FS mirror must coordinate with each other and with controllers of a slow scan (SS) mirror. This coordination requires each controller to have the necessary wiring and functionality to communicate with one another. In addition, it takes a number of computational resources for each controller to determine a change of a resonant frequency of a mirror and communicate the detected resonant frequency to the SS mirror controller. In turn, the SS mirror controller has to have the capabilities to process the signal indicating the resonant frequency and coordinate that input with a frame rate of the input media defining the displayed images. This type of architecture can be expensive from a computational resource standpoint. The high complexity of existing systems leads to high power consumption and low control efficiency and power efficiency. In addition, the complex coordination required by existing architectures do not always lead to optimal stability with respect to image quality. Each controller may not have the ability to react quickly enough when there are large swings in a resonant frequency of a mirror. Given that the mirror property variations are unpredictable, and given the fact that the resonant frequency could vary beyond the controllable range of the system, the complex coordination of the various control loops of existing devices can be ineffective as it is challenging to predict all possible use scenarios. Given these issues, there is an ongoing need to improve the robustness and efficiency of laser beam scanning devices.

SUMMARY

The techniques disclosed herein provide a laser beam display device that can dynamically control the resonant frequency of a mirror. The techniques disclosed herein address the above-described issues by controlling the resonant frequency of a mirror instead of requiring components of a display device to react to changes in resonant frequency. In one embodiment, a controller can drive a mirror with an input signal. The controller can also receive a signal or data indicating a target resonant frequency. The controller can bias the input signal to control the resonant frequency of the mirror. In some embodiments, the controller can also receive a feedback signal from the mirror indicating a current resonant frequency. The controller can then bias the input signal to increase or decrease the current resonant frequency. By dynamically controlling the current resonant frequency of a mirror, a device can minimize any difference between the current resonant frequency and the target resonant frequency.

As described in more detail below, a laser beam display device having improved robustness and image quality is provided. By stabilizing and controlling a resonant frequency of a mirror, a more simplistic, cost-effective architecture can be achieved. The architecture described herein does not require coordination between the various control loops to manage variances of a resonant frequency of a mirror. In addition, certain components, such as a slow scan mirror controller can operate autonomously without the need to coordinate with other components that track and measure a resonant frequency. Such features can also provide lower-cost designs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
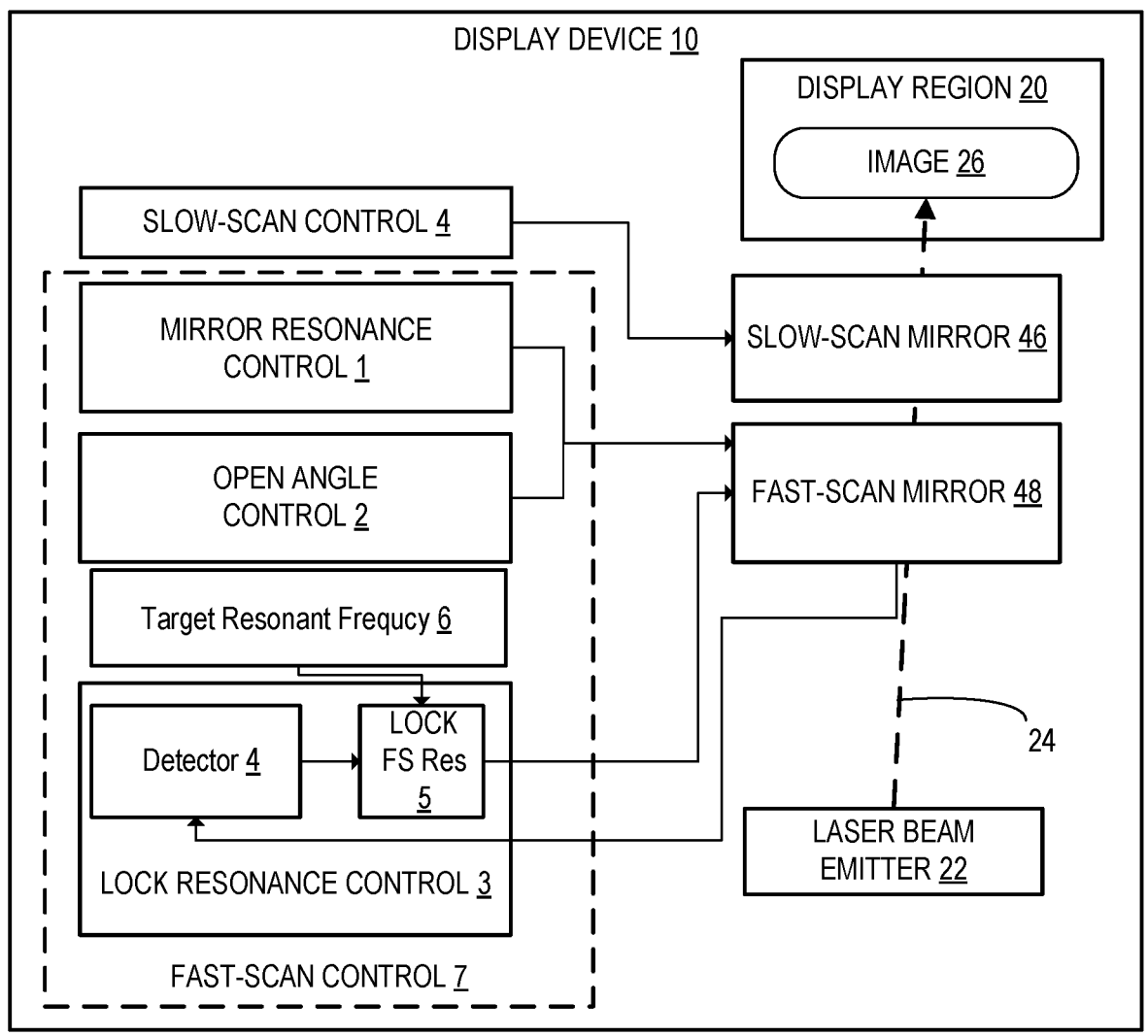
FIG. 1 schematically shows a display device having a loop for dynamically controlling the resonant frequency of a mirror.

FIG. 1 illustrates an example of a display device 10 for controlling the resonant frequency of a mirror. In this example, the display device 10 comprises a slow scan control 4 for controlling a slow scan mirror 46 and a fast scan control 7 for controlling a fast scan mirror 48. The slow scan mirror 46 and the fast scan mirror 48 direct a laser beam 24 emitted from a laser beam emitter 22 towards a display region 20 for generating an image 26. The fast scan control 7 comprises a mirror resonance control 1, an open angle control 2, and a lock resonance control 3. The lock resonance control 3 can control the resonant frequency of the fast scan mirror 48 by the use of a detector 4 and a lock FS resonance 5. The lock FS resonance 5 can receive data or a signal indicating a target resonant frequency 6. The lock FS resonance 5 can generate an input signal for the fast scan mirror 48. The lock FS resonance 5 can control a DC bias of the input signal, to vary the resonant frequency of the fast scan mirror 48 to minimize the difference between the resonant frequency of the fast scan mirror 48 and the target resonant frequency 6. With this design, the mirror resonance control 1, open angle control 2 and the slow scan control 4 can operate independently. Unlike existing systems, the slow scan control 4 is not required to receive any input from the fast scan control 7 to maintain the quality of the image 26. With this design, these control loops can be optimized during a system start-up and there is no need for continuous real-time optimization during operation.

Figure 2:
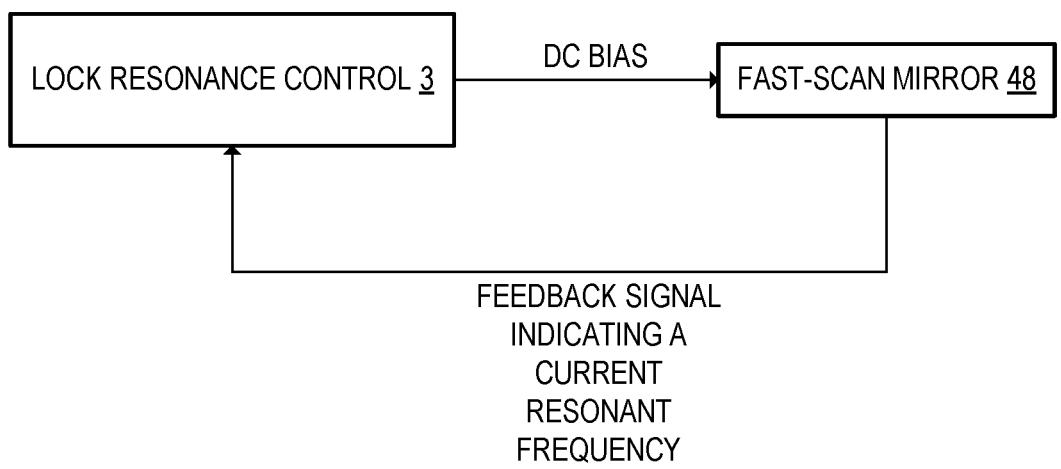
FIG. 2 schematically shows specific components and a feedback loop for a display device for dynamically controlling the resonant frequency of a mirror.

FIG. 2 schematically shows specific components and a feedback loop for a display device for dynamically controlling the resonant frequency of a mirror. In such an embodiment, a controller, such as the lock resonance control 3, can receive a feedback signal from the FS mirror 48 indicating a current resonant frequency of the FS mirror 48. The lock resonance control 3 can then control the DC bias of an input signal to the FS mirror 48 to increase or decrease the current resonant frequency of the FS mirror 48. By receiving and analyzing the feedback signal indicating the current resonant frequency, the lock resonance control 3 can adjust the DC bias of the input signal to stabilize the current resonant frequency at a predetermined level, e.g., a target level.

In some embodiments, the feedback signal can indicate a position of the mirror. In such an embodiment, the lock resonance control 3 can determine a current resonant frequency from one or more suitable techniques using a number of mirror positions. In one example, the lock resonance control 3 can perform a fast Fourier transform on a number of data points indicating a mirror position to identify the current resonant frequency. Such techniques are described in more detail below in conjunction with FIG. 6 through FIG. 11B.

In some embodiments, the fast scan mirror 48 can include a piezoelectric MEMS mirror or an electrostatic MEMS mirror. For a piezoelectric MEMS mirror, the resonant frequency variation is proportional to the vertical electrical field, and can be expressed as:

$$f_0 = f_0(0)\left[1 + \left(\frac{d_{33}}{2} - \frac{d_{311}}{2S_{11}^E}\right)E_3\right] \quad \text{Equation 1}$$

In Equation 1, $f_0(0)$ is the initial resonant frequency at 0 V, $S_{11}^E$ is the elastic compliance under constant electric field, $d_{311}$ is the nonlinear piezoelectric coefficient, and $E_3 = \sigma/\varepsilon$ is the vertical electrical field. In terms of voltage, the resonant frequency can be expressed as:

$$f_0 = f_0(0)\left[1 + \left(\frac{d_{33}}{2} - \frac{d_{311}}{2S_{11}^E}\right) \cdot \frac{V}{d_0 + d_{33}V}\right] \quad \text{Equation 2}$$

Equation 2 illustrates that the piezoelectric resonator can be tuned through applying a vertical voltage an input of the piezoelectric mirror. A piezoelectric mirror used as a fast-scan mirror is one resonator that follows this model. The piezoelectric mirror can work at its resonant frequency, but the resonant frequency can shift with time or under different environments, e.g., temperature changes, etc. The techniques disclosed herein can change the vertical bias voltage applied on the piezoelectric mirror and maintain the piezoelectric mirror resonant frequency at its original (e.g., a predetermined Target resonant frequency) value.

Figure 3:
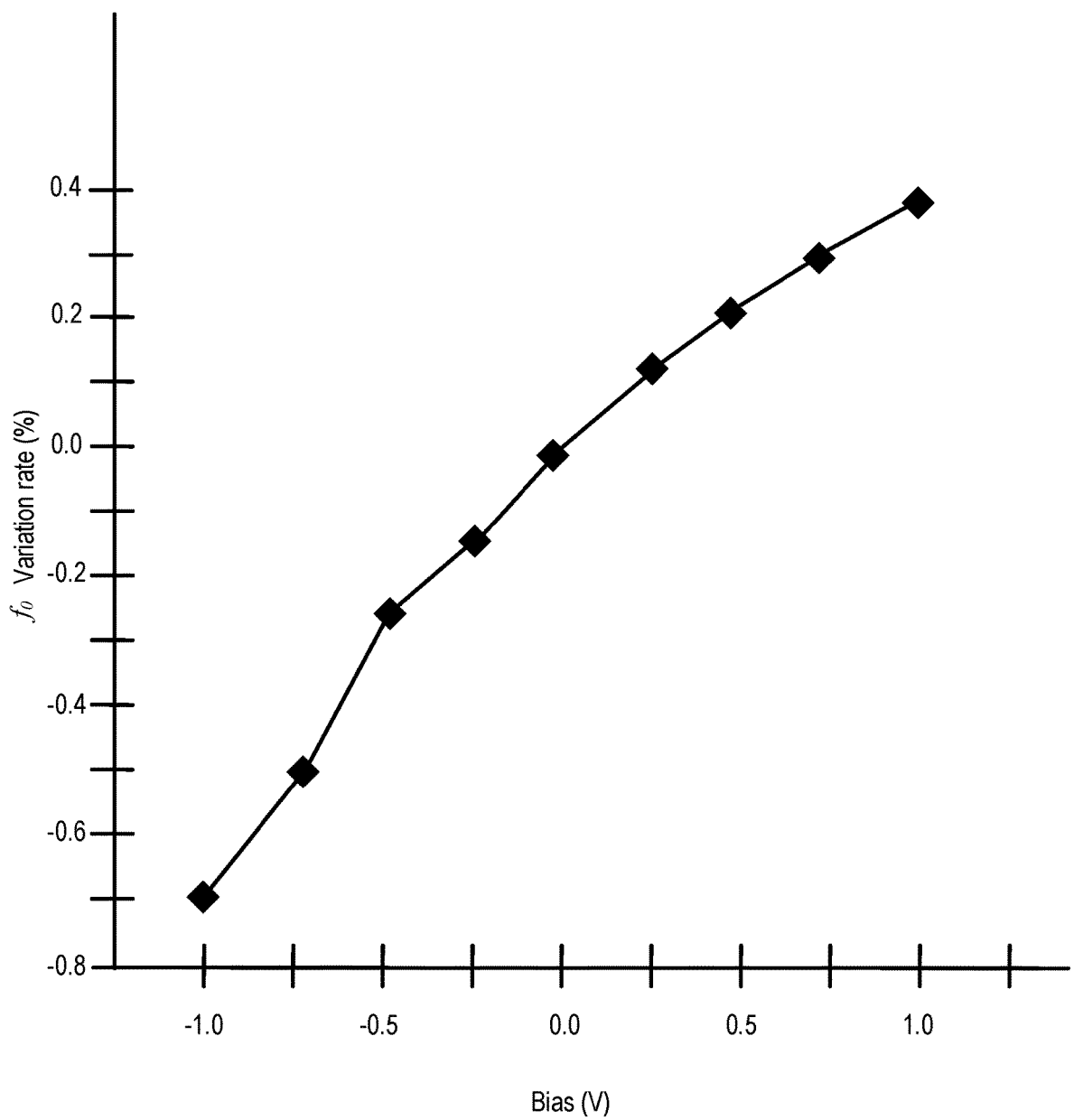
FIG. 3 shows a resonant frequency vs vertical voltage curve of a piezoelectric resonator.

FIG. 3 shows a resonant frequency vs vertical voltage curve of a piezoelectric resonator. As shown, a controller, such as the lock resonance controller, can apply a positive voltage to increase the piezoelectric mirror resonant frequency or apply a negative voltage to decrease the piezoelectric mirror resonant frequency. For example, based on one or more environmental factors such as a change in temperature, the resonant frequency of the piezoelectric mirror can shift from 26,988 Hz to 27,102 Hz. Once the controller detects this shift, the controller can then and then apply a DC voltage to an input signal, such as −0.02V, to the piezoelectric mirror. In response to the DC voltage change, the resonant frequency of the piezoelectric mirror shifts back to 26,988 Hz. By giving a display device this type of control over the resonant frequency, each component, including but not limited to the SS mirror, and the whole system continually works in a desired status.

In some embodiments, the resonant frequency of the FS mirror can be coordinated with a SS mirror operation frequency. By applying positive/negative voltage to the piezoelectric mirror, the FS mirror resonant frequency can be controlled to be an integer multiplier of the SS mirror working frequency (e.g., a frequency based on a frame rate of input media). Since the SS mirror does not have to adjust for changes in the resonant frequency, this coordination avoids the need for a complicated filter and DSP design. By having the SS mirror operate independently without the need to adjust for changes in the resonant frequency, the overall robust and power consumption of a control system is improved.

In another embodiment, the fast scan mirror 48 can comprise an electrostatic MEMS mirror. This embodiment helps achieve high speed scanning. The electrostatic resonator resonant frequency could be tuned through "spring constant softening" effects. The "spring softening" or "frequency pulling" nonlinearity arises because of an extra forcing function on the actuator that works against the restoring spring. This extra force creates extra displacement of the actuator, which makes the actuator move more than what is expected from the naively calculated electrostatic force.

Figure 4A:
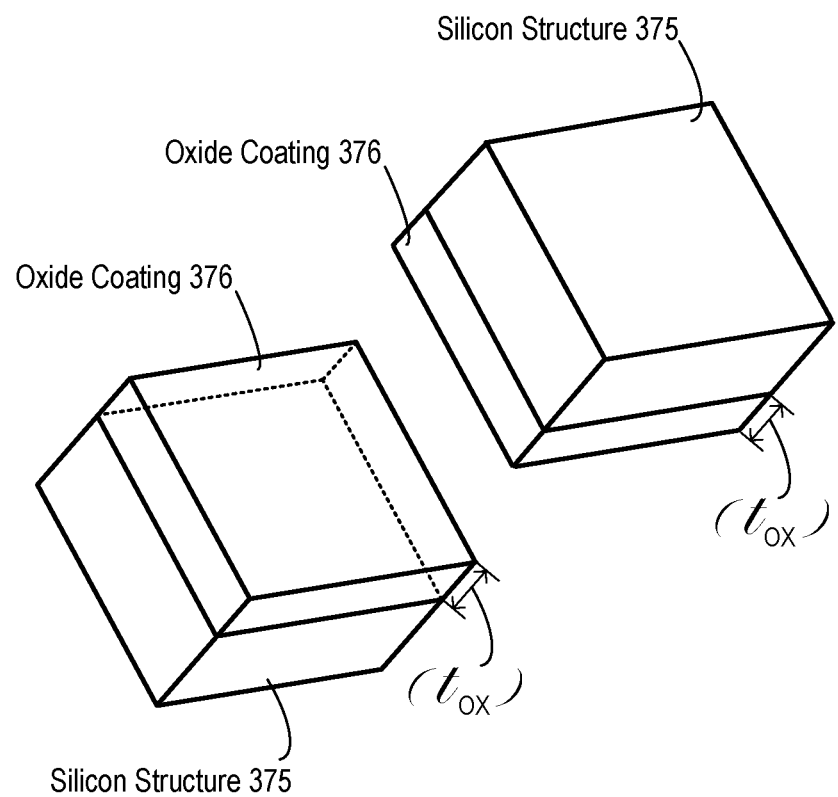
FIG. 4A shows an electrostatic actuator capacitor model.

FIG. 4A shows an electrostatic actuator capacitor model. In some embodiments, the electrostatic resonator can be modeled as the capacitor. This model comprises silicon structures 375 having oxide coatings 376. In this model, the oxide coatings 376 can have a thickness (t).

In addition to the resonant-frequency force that is applied to the resonator beams to actuate it, there is an additional force that results from the gradient of "DC" energy stored in the capacitor. The additional force can be modeled by the following equation:

$$F(t) = -\frac{V^2(t)}{2} \frac{\partial}{\partial x} C(t)$$

Equation 3

The tuned new resonance frequency, e.g., the controlled resonance frequency, can be represented as:

$$f'_o = \frac{1}{2\pi} \sqrt{\frac{k_{eff}}{m}}$$

$$= \frac{1}{2\pi} \sqrt{\frac{k - \beta V_{bias}^2}{m}}$$

Equation 4

Figure 4B:
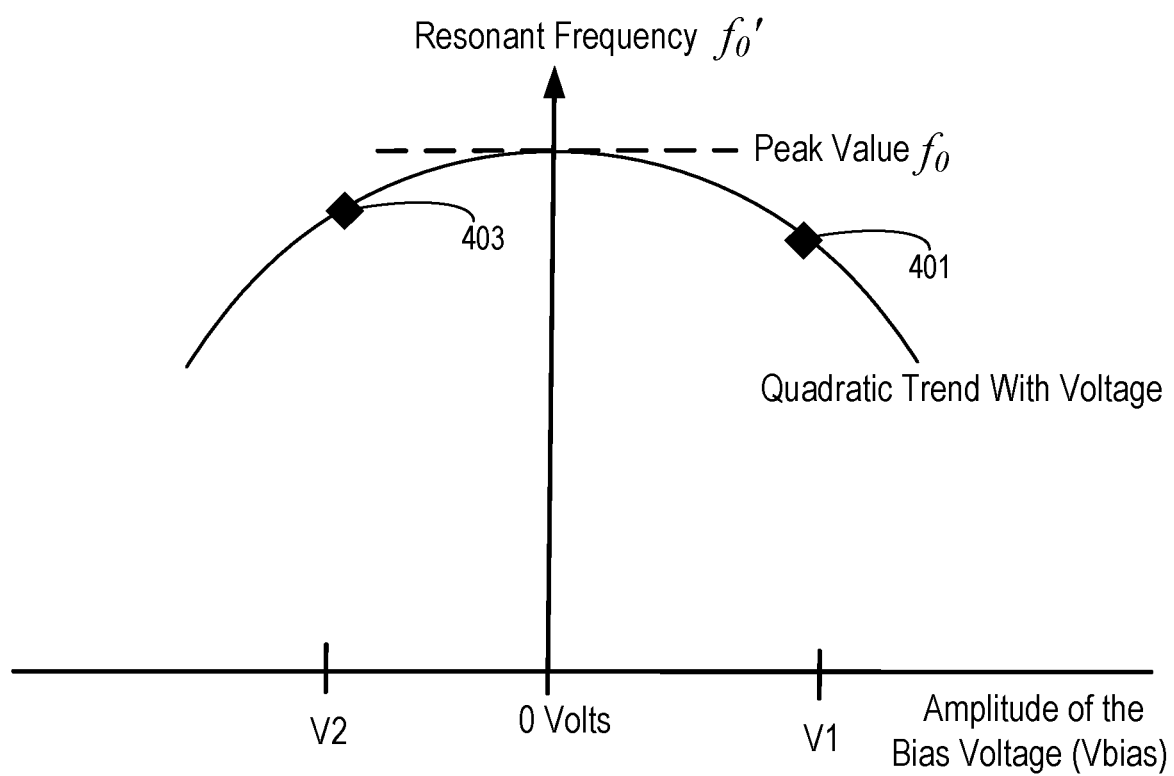
FIG. 4B illustrates a chart showing a resonant frequency vs bias voltage curve for an electrostatic resonator.

Equation 4 illustrates that the resonant frequency of the electrostatic MEMS could be tuned by applying the bias voltage (Vbias). FIG. 4B illustrates a resulting chart showing a resonant frequency vs bias voltage curve. As shown, the electrostatic MEMS resonant frequency decreases as a result of a decrease in the DC bias that is applied to the input of the electrostatic MEMS. In addition, the electrostatic MEMS resonant frequency increases as a result of an increase in the DC bias that is applied to the input of the electrostatic MEMS.

In one embodiment, a controller can bias the electrical MEMS at voltage V1, to achieve a predetermined resonant frequency 401. In such an embodiment, the controller can also decrease the bias to increase the electrostatic MEMS resonant frequency and increase the bias to decrease the electrostatic MEMS resonant frequency. In another embodiment, a controller can bias the electrical MEMS at voltage V2, to achieve another predetermined resonant frequency 403. In such an embodiment, the controller can also increase the bias to increase the electrostatic MEMS resonant frequency or decrease the bias to decrease the electrostatic MEMS resonant frequency.

Figure 5:
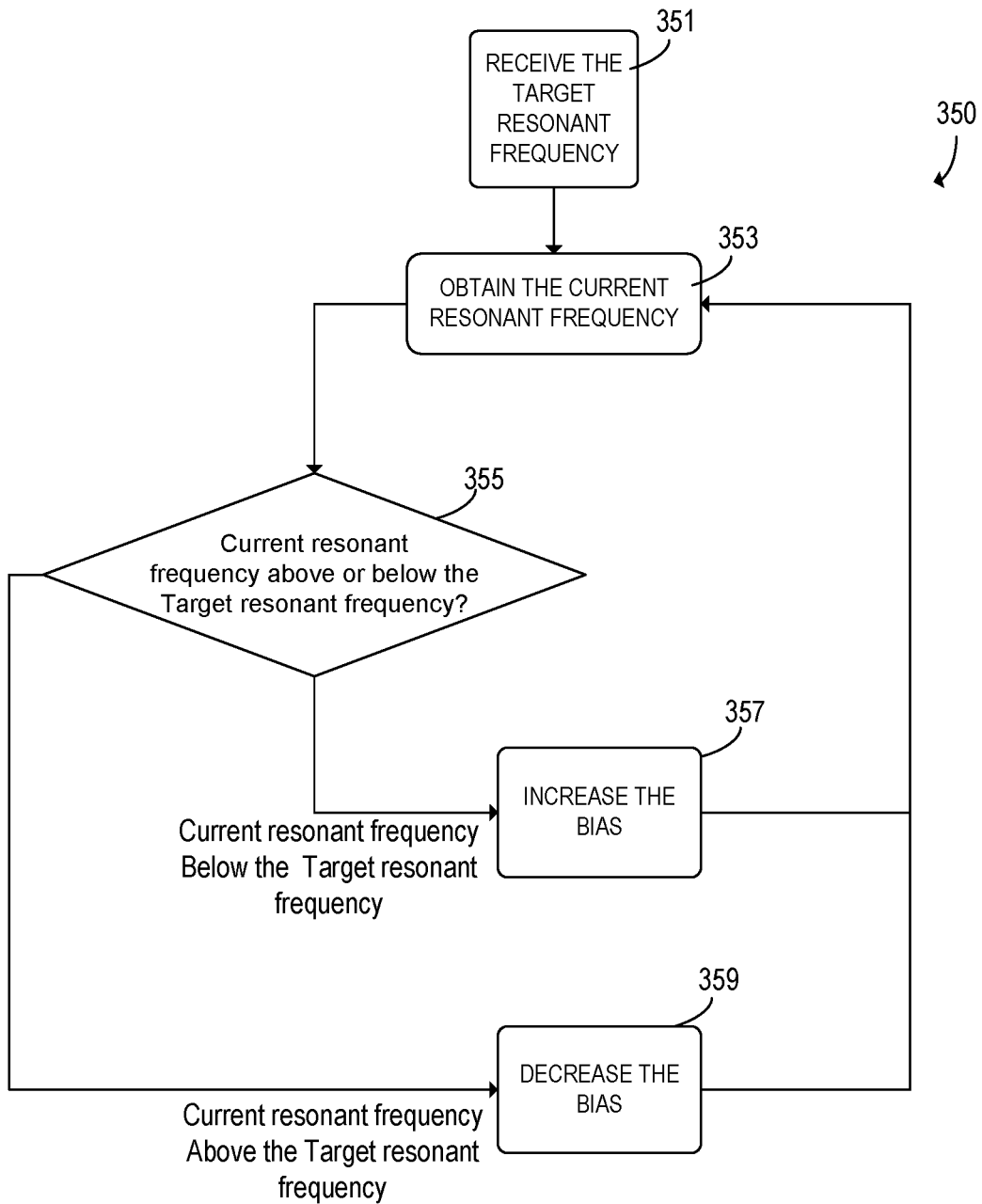
FIG. 5 illustrates a method for controlling the resonant frequency of a mirror.

FIG. 5 illustrates a method 350 for controlling the resonant frequency of a mirror. Generally described, the method 350 adjusts the resonant frequency of the mirror by biasing an input signal to the mirror. A controller can determine a current resonant frequency detected in a feedback signal from the mirror. The controller can then dynamically control the resonant frequency of the mirror to minimize the difference between the current resonant frequency and a target resonant frequency.

The method 350 starts at step 351 where a controller receives a target resonant frequency. The target resonant frequency can be defined by any suitable data or a signal received by the controller. The target resonant frequency can be any predetermined value. In some configurations, the target resonant frequency can be an integer multiplier of the SS mirror working frequency. The SS mirror working frequency can be based on a frame rate of any media defining the content used as an input to generate the displayed image.

Next, at step 353, the controller determines the current resonant frequency of the FS mirror can compares it with the target resonant frequency. The current resonant frequency of the FS mirror can be determined by any suitable technique. In some embodiments, a feedback signal produced by the FS mirror can define a position of the FS mirror. One or more methods can be performed using the position to determine the resonant frequency of the FS mirror. In one embodiment, the resonant frequency of the FS mirror can be determined by the techniques described below with respect to FIG. 6 through FIG. 11B.

As shown in FIG. 5, in response to determining that the current resonant frequency is below the target resonant frequency, the method 350 proceeds to step 357 where the controller increases the bias that is applied to the input of the FS mirror. By increasing the bias, the controller increases the current resonant frequency. This example is provided for illustrative purposes it is not to be construed as limiting. As described herein, any adjustment of the bias can include increasing or decreasing the bias to move the current resonant frequency in a desired direction. For example, if the system starts at V1 as shown in FIG. 4B, in step 357, the controller may actually decrease the bias to increase the resonant frequency of the FS mirror.

As shown in FIG. 5, in response to determining that the current resonant frequency is above the target frequency, the method 350 proceeds to step 359 where the controller decreases the bias that is applied to the input of the FS mirror. By decreasing the bias, the controller decreases the current resonant frequency. This example is provided for illustrative purposes it is not to be construed as limiting. As described herein, any adjustment of the bias can include increasing or decreasing the bias to move the current resonant frequency in a desired direction. For example, if the system starts at V1 as shown in FIG. 4B, in step 359, the controller may actually increase the bias of the input to the mirror to decrease the resonant frequency of the FS mirror.

After the bias is adjusted in step 357 or step 359, the method 350 proceeds back to step 353 where the controller measures the current resonant frequency of the FS mirror. The method 350 continues to cycle through step 353 through step 359 to continuously monitor and control the resonant frequency of the FS mirror. The controller minimizes the difference between the current resonant frequency and the target resonant frequency.

Figure 6:
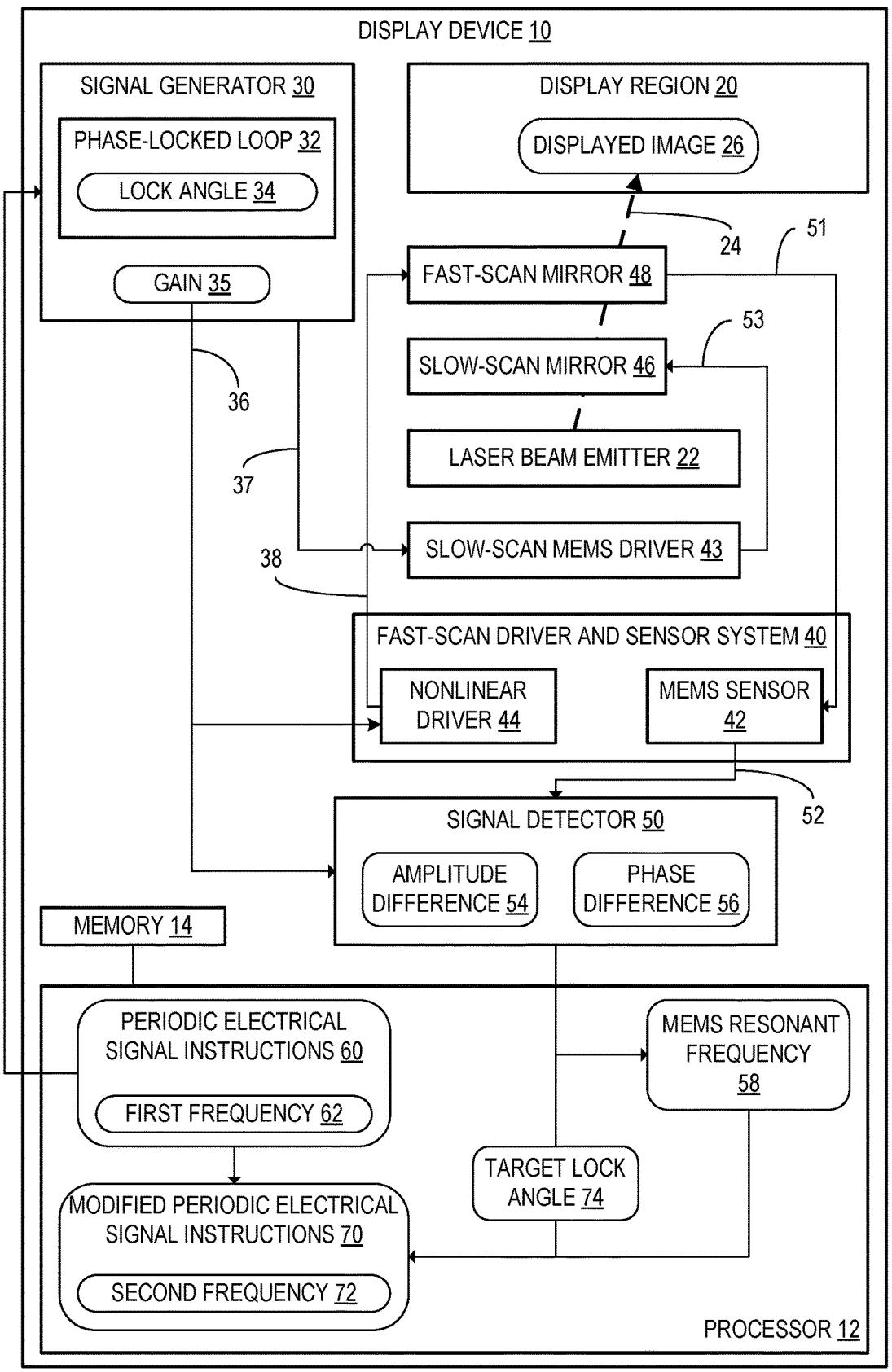
FIG. 6 schematically shows a display device capable of measuring a resonant frequency of a mirror.
Figure 7:
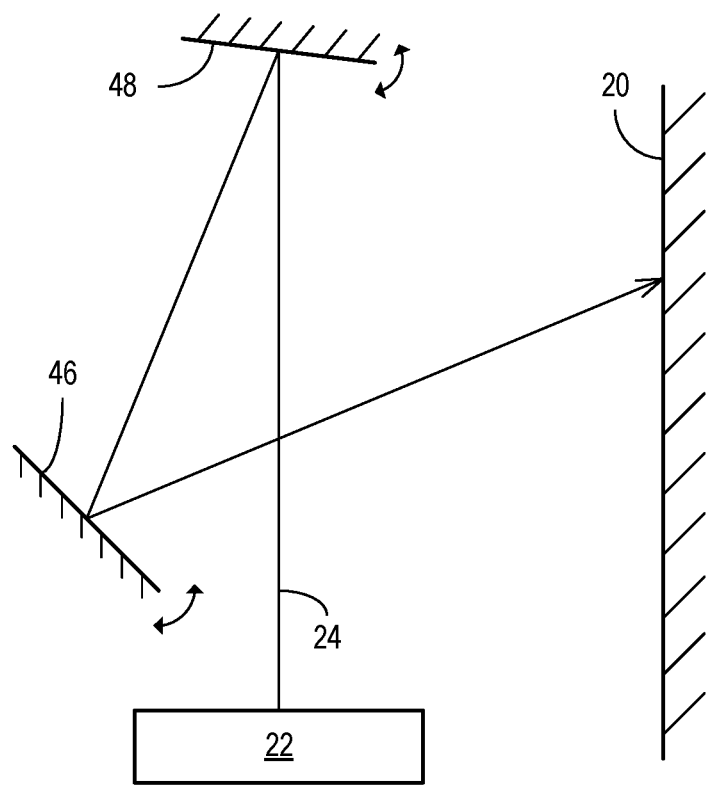
FIG. 7 shows a fast-scan mirror and a slow-scan mirror reflecting a laser beam onto a display region, according to the embodiment of FIG. 6.

FIG. 6 through FIG. 11B illustrate example techniques for determining the current resonant frequency of the FS mirror. FIG. 6 schematically shows a display device 10 that can be used to determine a resonant frequency of a mirror. The display device 10 may include a laser beam emitter 22 configured to emit a laser beam 24. For example, the laser beam emitter 22 may be a laser diode. The laser beam 24 may impinge upon a display region 20 of the display device 10 to form a displayed image 26. For example, the display region 20 may be a display of a head-mounted display device and the displayed image 26 may include one or more virtual objects.

Figure 8:
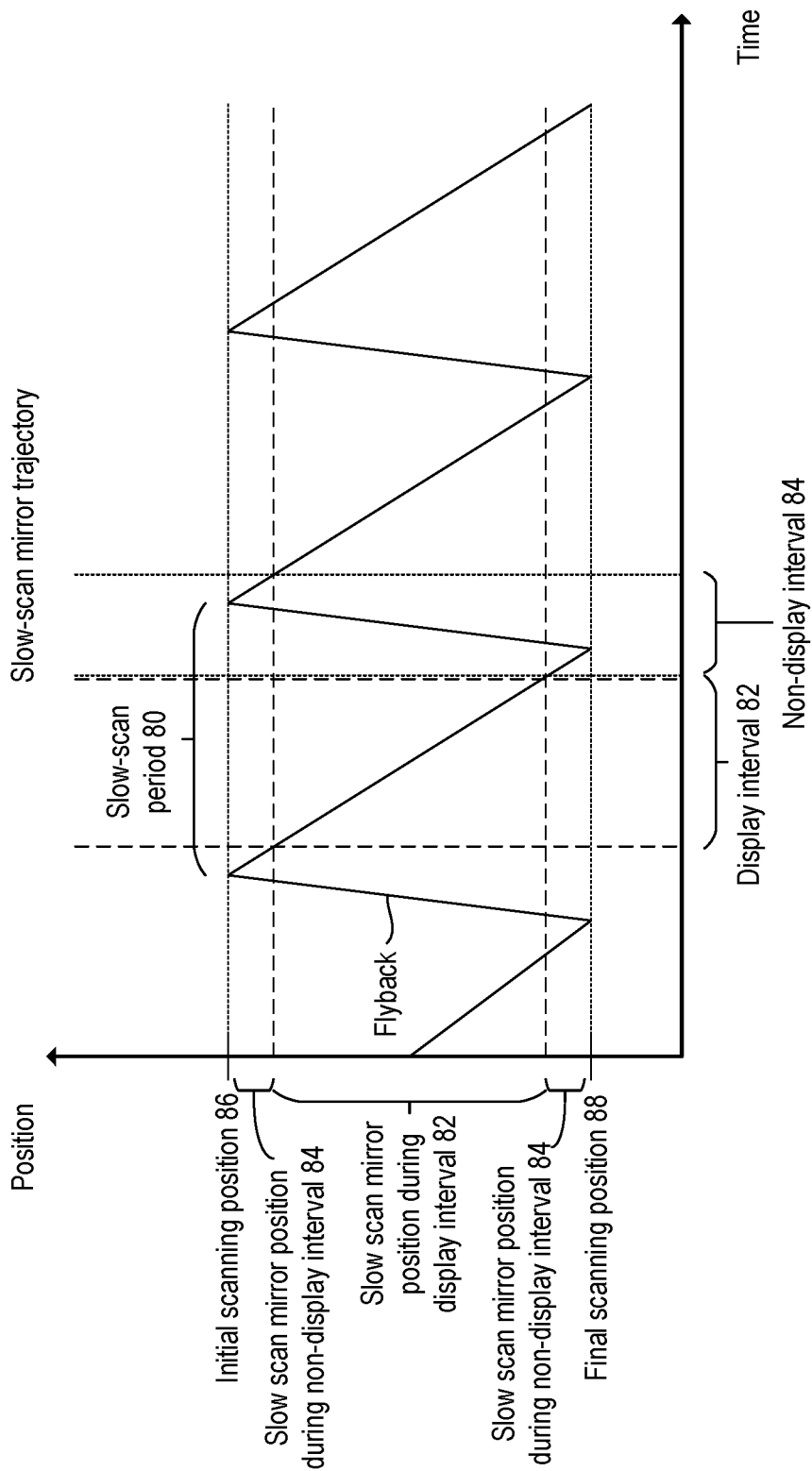
FIG. 8 shows an example slow-scan mirror trajectory.

The display device 10 may further include a slow-scan mirror 46 and a fast-scan mirror 48. The slow-scan mirror 46 and the fast-scan mirror 48 may be configured to reflect the laser beam 24 onto the display region 20, a shown in FIG. 7. The displayed image 26 may be displayed in one or more frames in which the slow-scan mirror 46 and the fast-scan mirror 48 direct the laser beam 24 across the display region 20 to "draw" the displayed image 26. In some embodiments, the slow-scan mirror 46 may be configured to complete a slow-scan period 80 during each frame. The slow-scan period 80 may include a display interval 82. As shown in FIG. 8, the slow-scan mirror 46 may linearly scan across the display region 20 from an initial scanning position 86 to a final scanning position 88. The laser beam emitter 22 may be configured to emit the laser beam 24 during the display interval 82. In the display interval 82, the fast-scan mirror 48 may perform a plurality of scans across the display region 20 to "draw" the displayed image 26.

The slow-scan period 80 may further include a non-display interval 84. During the non-display interval 84, the slow-scan mirror 46 may be configured to return from the final scanning position 88 to the initial scanning position 86. This portion of the non-display interval 84 may also be referred to as the flyback. During the non-display interval 84, the laser beam emitter 22 may be configured to not emit the laser beam 24. In some embodiments, as shown in the example of FIG. 5, the display region 20 may include one or more blank regions in which the displayed image 26 is not displayed. In addition to the flyback, the non-display interval 84 may include time during which the slow-scan mirror 46 is oriented toward the one or more blank regions. The initial scanning position 86 and the final scanning position 88 may be located in the one or more blank regions, as shown in FIG. 8.

Returning to FIG. 6, the fast-scan mirror 48 may be driven by a nonlinear driver 44, which may be included in a fast-scan driver and sensor system 40. The fast-scan driver and sensor system 40 may further include a fast-scan MEMS sensor 42. The fast-scan MEMS sensor 42 may be configured to detect the motion and/or position of the fast-scan mirror 48. For example, the fast-scan mirror 48 may be configured to transmit a fast-scan mirror output signal 51 to the fast-scan MEMS sensor 42. The fast-scan mirror 48 and the nonlinear driver 44 may together have a MEMS resonant frequency 58. In addition to the fast-scan MEMS sensor 42 and the nonlinear driver 44, the display device 10 may further include a slow-scan MEMS driver 43 configured to drive the slow-scan mirror 46.

The display device 10 may further include a signal generator 30. In order to drive the fast-scan driver system 40, the signal generator 30 may be configured to generate a periodic electrical signal 36 having a first frequency 62. For example, the periodic electrical signal 36 may be a sine wave, a square wave, a triangle wave, a sawtooth wave, or some other type of periodic wave. The periodic electrical signal 36 may be used to drive the fast-scan mirror 48. The signal generator 30 may be configured to generate the periodic electrical signal 36 based on periodic electrical signal instructions 60 received from a processor 12 included in the display device 10, as discussed in further detail below. The periodic electrical signal instructions 60 may indicate the first frequency 62 at which the nonlinear driver 44 is configured to drive the fast-scan mirror 48.

The slow-scan mirror 46 may be driven by the slow-scan MEMS driver 43 separately from the fast-scan mirror 48. The slow-scan mirror 46 may be driven by another periodic electrical signal 37 received from the signal generator 30. The other periodic electrical signal 37 may, in some embodiments, complete one period every slow-scan period 80. For example, the other periodic electrical signal 37 may drive the slow-scan mirror with a sawtooth waveform, as shown in FIG. 8.

The nonlinear driver 44 may be configured to receive the periodic electrical signal 36 from the signal generator 30. The nonlinear driver 44 may be further configured to amplify the periodic electrical signal 36 to produce an amplified signal 38. The nonlinear driver 44 may be nonlinear in that its gain may vary as a function of the frequency of the periodic electrical signal 36. Using a nonlinear driver 44 rather than a linear driver may have the advantage of allowing the fast-scan driver system 40 to more efficiently drive the fast-scan mirror 48. The nonlinear driver 44 may be further configured to transmit the amplified signal 38 to the fast-scan mirror 48 to drive the fast-scan mirror 48.

The display device 10 may further include a signal detector 50. The signal detector 50 may be configured to receive the periodic electrical signal 36 from the signal generator 30. The signal detector 50 may be further configured to receive a fast-scan MEMS sensor output signal 52 from the fast-scan MEMS sensor 42. The signal detector may be further configured to detect an amplitude difference 54 and/or a phase difference 56 between the periodic electrical signal 36 and the fast-scan MEMS sensor output signal 52. The phase difference is detected, for example, from the interference between the periodic electrical signal 36 and the fast-scan MEMS sensor output signal 52.

The display device 10 may further include a processor 12, which may be operatively coupled to memory 14. In some embodiments, the processor 12 may be configured to receive the amplitude difference 54 and/or the phase difference 56 from the signal detector 50. In other embodiments, the processor 12 may receive the periodic electrical signal 36 and the fast-scan MEMS sensor output signal 52 rather than receiving the amplitude difference 54 from the signal detector 50. The processor 12 may be further configured to determine, based on the amplitude difference 54, the driver system resonant frequency 58 of the fast-scan driver system 40. In some embodiments, as discussed above, the processor 12 may be configured to determine the driver system resonant frequency 58 at least in part by determining a phase difference 56 between the periodic electrical signal 36 and the fast-scan MEMS sensor output signal 52. In such embodiments, the processor 12 may be configured to determine the phase difference 56 at least in part by performing a fast Fourier transform on the amplitude difference signal received from the signal detector 50.

Figure 9:
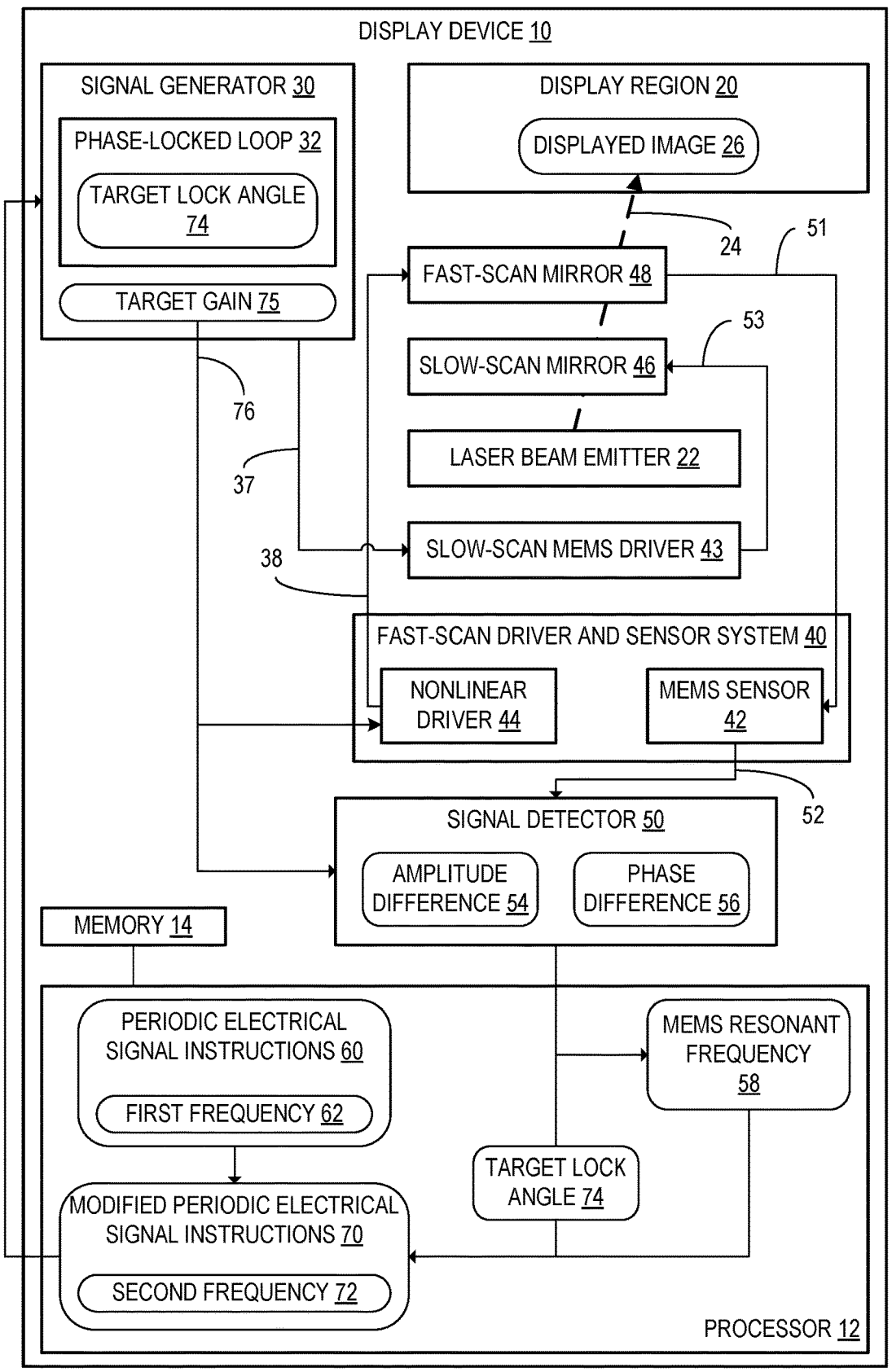
FIG. 9 shows the display device of FIG. 6 when the frequency of the periodic electrical signal is modified.

In some embodiments, the processor 12 may be further configured to generate modified periodic electrical signal instructions 70 based on the driver system resonant frequency 58. The modified periodic electrical signal instructions 70 may include a second frequency 72 different from the first frequency 62. The processor 12 may be further configured to transmit the modified periodic electrical signal instructions 70 to the signal generator 30, as shown in FIG. 9. In response to receiving the modified periodic electrical signal instructions 70, the signal generator 30 may be configured to generate a modified periodic electrical signal 76 with the second frequency 72. In some embodiments, the second frequency 72 may be the driver system resonant frequency 58.

Figure 10:
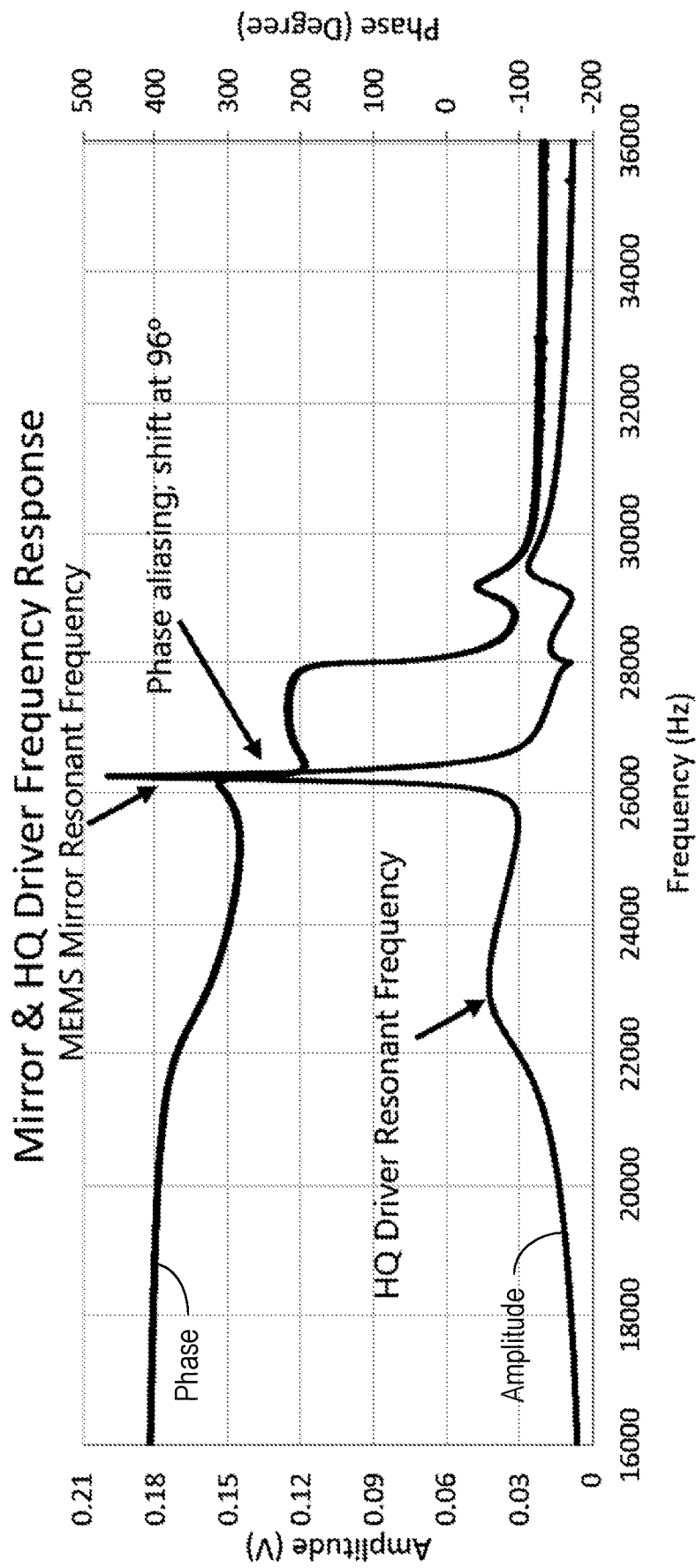
FIG. 10 shows an example plot of the amplitude and phase of the fast-scan driver system.

In some embodiments, the signal generator 30 may include a phase-locked loop 32. In such embodiments, the phase-locked loop 32 may have a lock angle 34 between the periodic electrical signal 36 and the fast-scan MEMS sensor output signal 52. FIG. 10 shows an example plot of the amplitude and phase of the fast-scan driver system 40 in an embodiment in which the lock angle is 96°. If a linear driver were used rather than the nonlinear driver 44, the phase difference 56 between the periodic electrical signal 36 and the fast-scan MEMS sensor output signal 52 would be 90°. However, using the nonlinear driver 44 instead of a linear driver may result in a phase difference other than 90° due to phase aliasing between the nonlinear driver 44 and the fast-scan mirror 48. The lock angle 34 may be set to 96° in the example of FIG. 10 in order to match the 96° offset between the periodic electrical signal 36 and the fast-scan MEMS sensor output signal 52 and allow the fast-scan driver system 40 to operate at the MEMS resonant frequency 58. It will be appreciated that these specific lock angles are merely exemplary and other lock angles are possible.

In embodiments in which the signal generator 30 includes a phase-locked loop 32, the processor 12 may be configured to generate the modified periodic electrical signal instructions 70 at least in part by modifying a lock angle 34 of the phase-locked loop 32 to have a target lock angle 74. Additionally or alternatively, the processor 12 may be further configured to determine the driver system resonant frequency 58 at least in part by determining a gain 35 of the signal generator 30. when the fast-scan driver system 40 receives the periodic electrical signal 36 from the signal generator 30. The processor 12 may determine the gain 35 of the phase-locked loop 32 in embodiments in which the processor 12 receives the periodic electrical signal 36 from the signal generator 30. In such embodiments, the processor 12 may modify the first frequency 62 such that the signal generator 30 has a target gain 75. The target gain 75 may be a minimum gain.

Figure 11A:
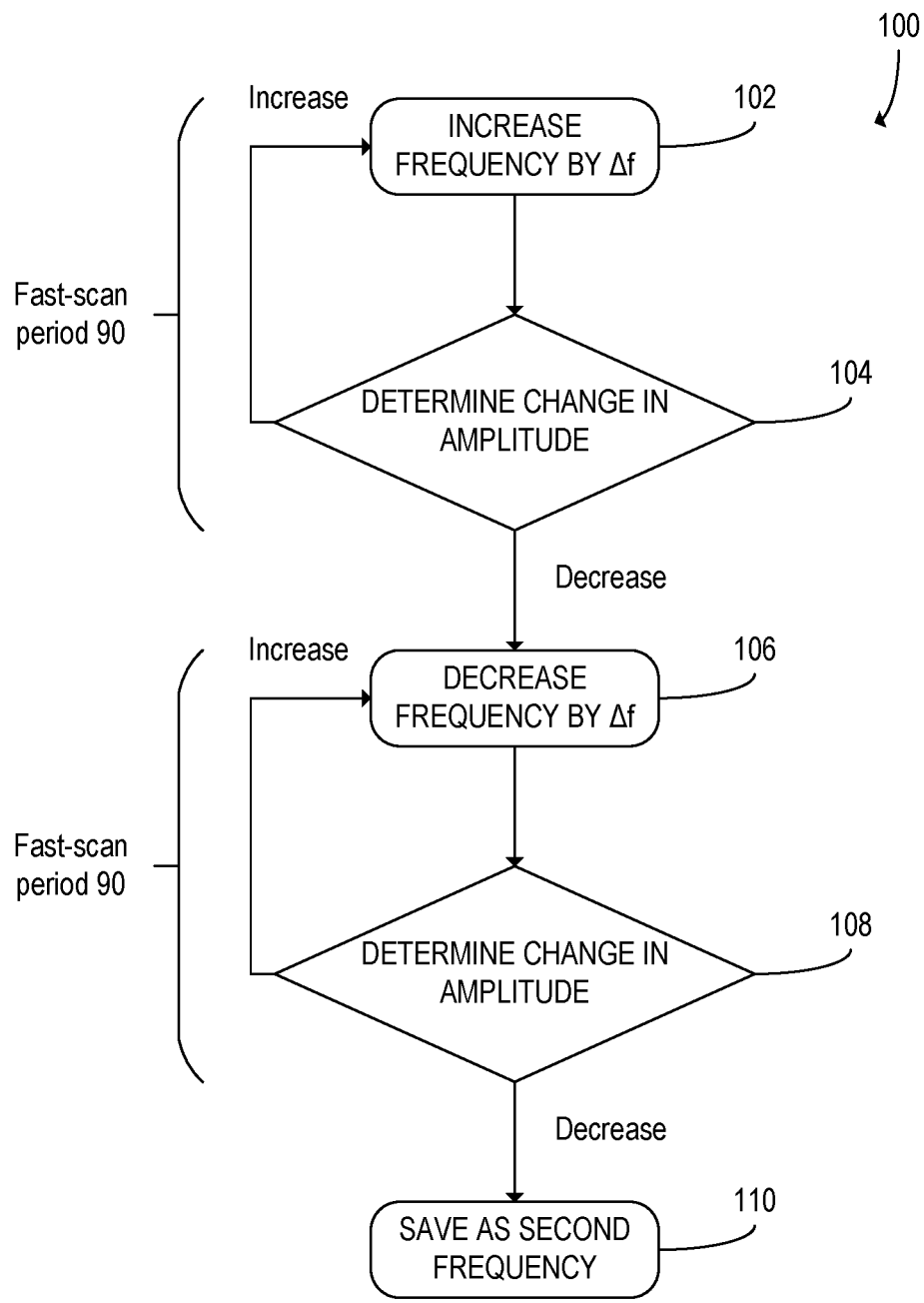
FIG. 11A shows a flowchart of a method for modifying the frequency of the periodic electrical signal for determining a resonant frequency of a mirror.

FIG. 11A shows a method 100 for searching for a resonance peak of the fast-scan driver system 40. In some embodiments, the processor 12 may be configured to determine (e.g., "measure") the driver system resonant frequency 58 at least in part by detecting a plurality of amplitude differences 54 in a respective plurality of fast-scan periods 90. The plurality of fast-scan periods 90 may occur during the non-display interval 84. Alternatively, the plurality of fast-scan periods 90 may occur in both the display interval 82 and the non-display interval 84, or only in the display interval 82. The processor 12 may be further configured to iteratively update the first frequency 62 over the plurality of fast-scan periods 90 to determine the second frequency 72. At step 102 of the flowchart 100, the processor 12 may increase the first frequency 62 indicated in the periodic electrical signal instructions 60 by a change in frequency Δf. The modified periodic electrical signal instructions 70 with this increase in frequency may be transmitted to the signal generator 30 and executed to generate a modified periodic electrical signal 76.

At step 104, the processor 12 may determine the change in the amplitude of the fast-scan MEMS sensor output signal 52 resulting from the increase in the frequency. The change in amplitude may be a change in the amplitude difference 54 between the previous fast-scan period 90 and the current fast-scan period 90. When the amplitude increases, the processor 12 may repeat step 102 and increase the frequency by Δf again. However, when the amplitude decreases, the processor 12 may decrease the frequency indicated in the periodic electrical signal instructions 60 by a change in frequency Δf. In other embodiments, the processor 12 may decrease the first frequency 62 by some other amount.

The processor 12 may be further configured to, at step 108, determine the change in the amplitude of the fast-scan MEMS sensor output signal 52 following the decrease in the frequency. When the frequency increases, the processor 12 may repeat step 106. When the frequency increases, the processor 12 may instead save the current frequency as the second frequency 72. In embodiments in which the signal generator 30 includes a phase-locked loop 32, saving the current frequency as the second frequency 72 may include modifying the lock angle 34 of the phase-locked loop 32. Additionally or alternatively, at step 110, the current frequency may be saved as the second frequency 72 in the memory 14 of the display device 10.

Thus, via the method of FIG. 11A, the processor 12 may search for the resonance peak of the MEMS sensor output signal 52 by iteratively increasing and/or decreasing the frequency of the periodic electrical signal 36 and determining the change in the amplitude of the MEMS sensor output signal 52 to search for a peak in the amplitude. Although FIG. 11A shows the increase in frequency at step 102 prior to the decrease in frequency at step 106, the method 100 may include decreasing the frequency of the periodic electrical signal 36 prior to increasing the frequency in other embodiments. In addition, in embodiments in which the processor 12 is configured to determine the change in the gain 35 of the signal generator 30 while the amplitude difference is kept constant, the searching method shown in FIG. 11A may be applied to the gain 35 rather than the amplitude of the fast-scan MEMS sensor output signal 52. In addition, the search for the gain 35 is not limited to the non-display interval 84.

Figure 11B:
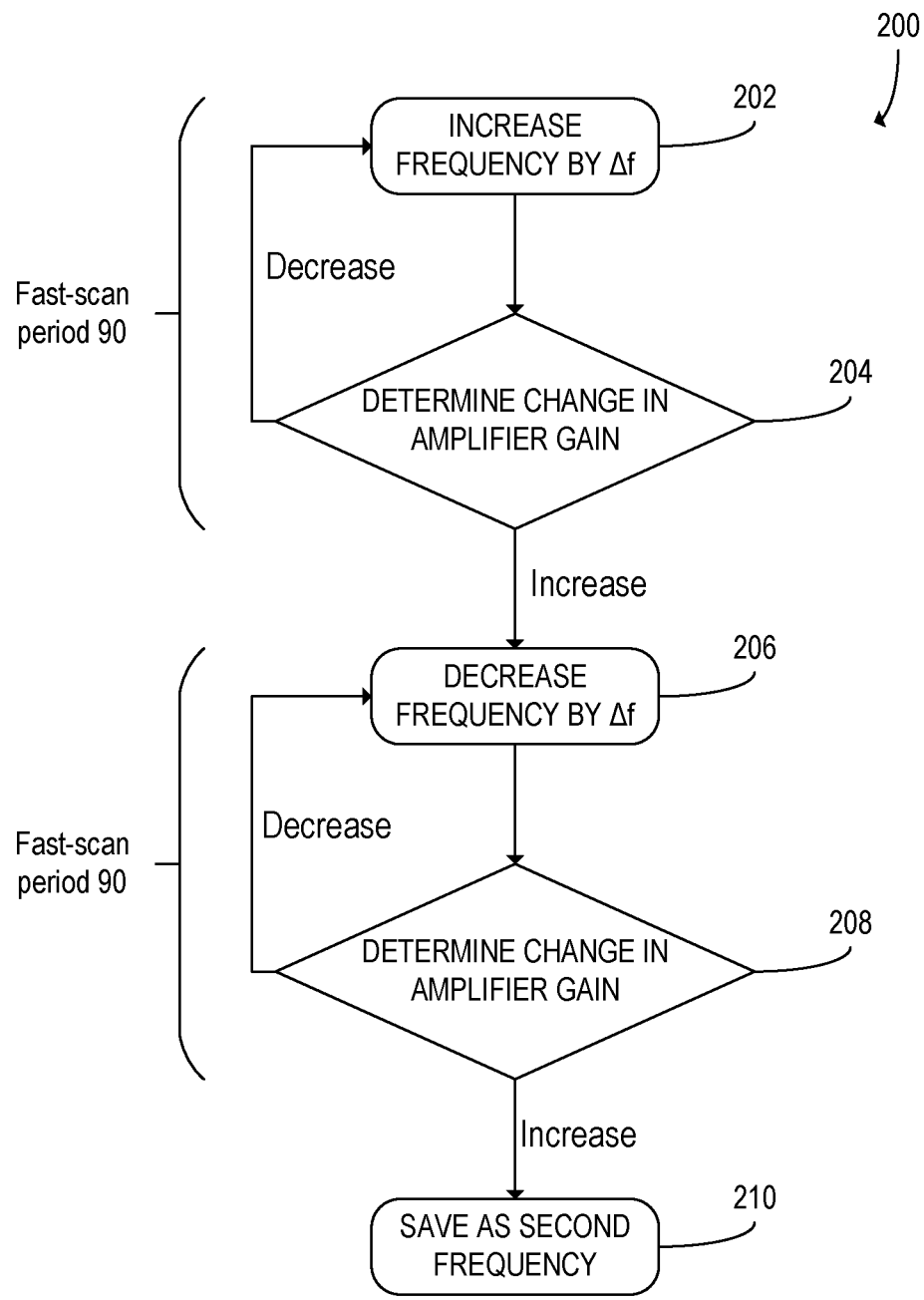
FIG. 11B shows a flowchart of another method for determining a resonant frequency of a mirror by the use of an amplifier gain.

FIG. 11B shows another method 200 for searching for a resonance peak of the fast-scan driver system 40. In some embodiments, the processor 12 may be configured to determine (e.g., "measure") the driver system resonant frequency 58 at least in part by detecting a plurality of amplifier gain differences in a respective plurality of fast-scan periods 90. The plurality of fast-scan periods 90 may occur during the non-display interval 84. Alternatively, the plurality of fast-scan periods 90 may occur in both the display interval 82 and the non-display interval 84, or only in the display interval 82. The processor 12 may be further configured to iteratively update the first frequency 62 over the plurality of fast-scan periods 90 to determine the second frequency 72. At step 202 of the method 200, the processor 12 may increase the first frequency 62 indicated in the periodic electrical signal instructions 60 by a change in frequency Δf. The modified periodic electrical signal instructions 70 with this increase in frequency may be transmitted to the signal generator 30 and executed to generate a modified periodic electrical signal 76 as shown in FIG. 9.

At step 204, the processor 12 may determine the change in the amplifier gain resulting from the increase in the frequency. The change in the amplifier gain may be a change in the gain difference between the previous fast-scan period 90 and the current fast-scan period 90. When the amplifier gain decreases, the processor 12 may repeat step 202 and increase the frequency by Δf again. However, when the amplifier gain decreases, the processor 12 may increase the frequency indicated in the periodic electrical signal instructions 60 by a change in frequency Δf. In other embodiments, the processor 12 may decrease the first frequency 62 by some other amount.

The processor 12 may be further configured to, at step 208, determine the change in the amplifier gain following the decrease in the frequency. When the frequency decreases, the processor 12 may repeat step 206. When the frequency decreases, the processor 12 may instead save the current frequency as the second frequency 72. In embodiments in which the signal generator 30 includes a phase-locked loop 32, saving the current frequency as the second frequency 72 may include modifying the lock angle 34 of the phase-locked loop 32. Additionally or alternatively, at step 210, the current frequency may be saved as the second frequency 72 in the memory 14 of the display device 10.

Thus, via the method of FIG. 11B, the processor 12 may search for the resonance peak of the MEMS sensor output signal 52 by iteratively increasing and/or decreasing the frequency of the periodic electrical signal 36 and determining the change in the amplifier gain to search for a peak in the amplitude. Although FIG. 11B shows the increase in frequency at step 202 prior to the decrease in frequency at step 206, the method 200 may include decreasing the frequency of the periodic electrical signal 36 prior to increasing the frequency in other embodiments.

Figure 12:
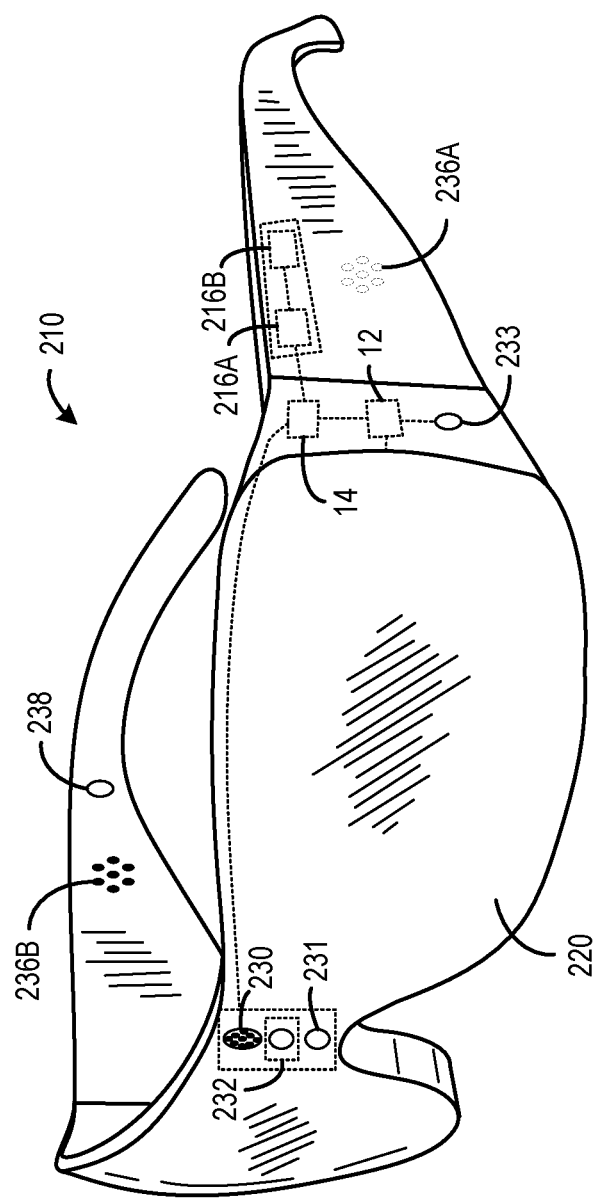
FIG. 12 shows the display device in the form of a head-mounted display device.

FIG. 12 shows an example embodiment of the display device 10 in which the display device 10 is a head-mounted display device 210 having the form of wearable glasses or goggles, but it will be appreciated that other forms are possible. The head-mounted display device 210 may include an output device suite including a display 220. In some embodiments, the head-mounted display device 210 may be configured in an augmented reality configuration to present an augmented reality environment, and thus the display 220 may be an at least partially see-through stereoscopic display configured to visually augment an appearance of a physical environment being viewed by the user through the display 220. In some examples, the display 220 may include one or more regions that are transparent (e.g. optically clear) and may include one or more regions that are opaque or semi-transparent. In other examples, the display 220 may be transparent (e.g. optically clear) across an entire usable display surface of the display 220.

The output device suite of the head-mounted display device 210 may, for example, include an image production system that is configured to display one or more virtual objects to the user with the display 220. The processor 12 may be configured to output for display on the display 220 a mixed reality experience including one or more virtual objects superimposed upon the physical environment. In the augmented reality configuration with an at least partially see-through display, the virtual objects are visually superimposed onto the physical environment that is visible through the display 220 so as to be perceived at various depths and locations. In one embodiment, the head-mounted display device 210 may use stereoscopy to visually place a virtual object at a desired depth by displaying separate images of the virtual object to both of the user's eyes. Using this stereoscopy technique, the head-mounted display device 210 may control the displayed images of the virtual objects, such that the user will perceive that the virtual objects exist at a desired depth and location in the viewed physical environment.

Alternatively, the head-mounted display device 210 may be configured in a virtual reality configuration to present a full virtual reality environment, and thus the display 220 may be a non-see-though stereoscopic display. The head-mounted display device 210 may be configured to display virtual three-dimensional environments to the user via the non-see-through stereoscopic display. The head-mounted display device 210 may be configured to display a virtual representation such as a three-dimensional graphical rendering of the physical environment in front of the user that may include additional virtual objects. Displaying the virtual representation of the physical environment may include generating a two-dimensional projection of a three-dimensional model of the physical environment onto the surface of the display 220. As another alternative, the computing system may include a portable computing device that is not head mounted, such as a smartphone or tablet computing device. In such a device, camera-based augmented reality may be achieved by capturing an image of the physical environment through a forward-facing camera and displaying the captured image on a user-facing display along with world locked graphical images superimposed on the captured image. While the computing system is primarily described in terms of the head-mounted display device 210 herein, it will be appreciated that many features of the head-mounted display device 210 are also applicable to such a portable computing device that is not head mounted.

The output device suite of the head-mounted display device 210 may further include one or more speakers 236 configured to emit sound. In some embodiments, the head-mounted display device 210 may include at least a left speaker 236A and a right speaker 236B situated such that the left speaker 236A may be located proximate the user's left ear and the right speaker 236B may be located proximate the user's right ear when the head-mounted display device 210 is worn. Thus, the one or more speakers 236 may emit stereo sound output. The output device suite may further include one or more haptic feedback devices 238 configured to provide tactile output (e.g. vibration).

The head-mounted display device 210 may include an input device suite including one or more input devices. The input device suite of the head-mounted display device 210 may include one or more optical sensors. In one example, the input device suite includes an outward-facing optical sensor 230 that may be configured to detect the real-world background from a similar vantage point (e.g., line of sight) as observed by the user through the display 220 in an augmented reality configuration. The input device suite may additionally include an inward-facing optical sensor 231 that may be configured to detect a gaze direction of the user's eyes. It will be appreciated that the outward facing optical sensor 230 and/or the inward-facing optical sensor 231 may include one or more component sensors, including an RGB camera and a depth camera. The RGB camera may be a high definition camera or have another resolution. The depth camera may be configured to project non-visible light and capture reflections of the projected light, and based thereon, generate an image comprised of measured depth data for each pixel in the image. This depth data may be combined with color information from the image captured by the RGB camera, into a single image representation including both color data and depth data, if desired.

The input device suite of the head-mounted display device 210 may further include a position sensor system that may include one or more position sensors 232 such as accelerometer(s), gyroscope(s), magnetometer(s), global positioning system(s), multilateration tracker(s), and/or other sensors that output position data as a position, orientation, and/or movement of the relevant sensor. The input device suite may further include one or more microphones 233 configured to collect sound data.

Optical sensor information received from the one or more optical sensors and/or position data received from position sensors 232 may be used to assess a position and orientation of the vantage point of head-mounted display device 210 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined by the processor 12 of the head-mounted display device 210 and/or by an off-board computing system.

Furthermore, the optical sensor information and the position sensor information may be used by the head-mounted display system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location. The virtual model is a three-dimensional model and may be referred to as "world space," and may be contrasted with the projection of world space viewable on the display 220, which is referred to as "screen space." Additionally, the optical sensor information received from the one or more optical sensors may be used to identify and track objects in the field of view of the one or more optical sensors. The optical sensors may also be used to identify machine recognizable visual features in the physical environment and use the relative movement of those features in successive frames to compute a frame to frame relative pose change for the head mounted display device 210 within the world space of the virtual model.

The head-mounted display device 210 may further include a communication system including one or more communication devices 216, which may include one or more receivers 216A and/or one or more transmitters 216B. In embodiments in which the head-mounted display device 210 communicates with an off-board computing system, the one or more receivers 216A may be configured to receive data from the off-board computing system, and the one or more transmitters 216B may be configured to send data to the off-board computing system. In some embodiments, the head-mounted display device 210 may communicate with the off-board computing system via a network, which may be a wireless local- or wide-area network. Additionally or alternatively, the head-mounted display device 210 may communicate with the off-board computing system via a wired connection. The head-mounted display device 210 may be further configured to communicate with a server computing system via the communication system.

Figure 13A:
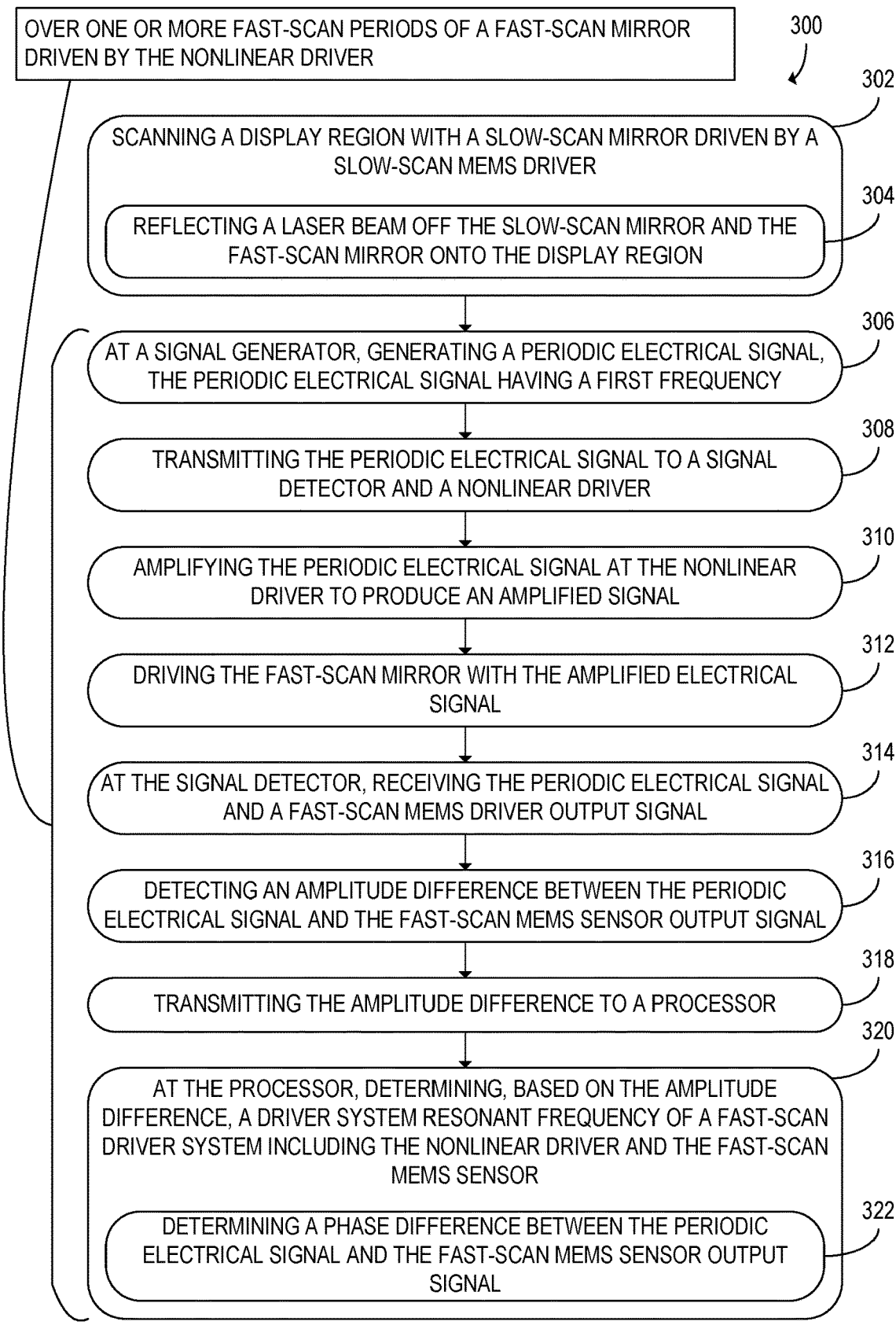
FIG. 13A shows a method for use with a display device, according to the embodiment of FIG. 6.

FIG. 13A shows a flowchart of a method 300 for use with a display device, according to one example embodiment. The display device may be the display device 10 of FIG. 6 or may alternatively be some other display device. The method 300 may include, at step 302, scanning a display region with a slow-scan mirror driven by a slow-scan MEMS driver. The slow-scan mirror may scan the display region once per frame during a display interval. During the display interval, the slow-scan mirror may move from an initial scanning position to a final scanning position. While the slow-scan mirror scans the display region, a fast-scan mirror driven by a nonlinear driver may also scan the display region to "draw" a displayed image on the display region. The fast-scan mirror may scan the display region multiple times in a plurality of fast-scan periods during each slow-scan period. In some embodiments, scanning the display region may include, at step 304, reflecting a laser beam off the slow-scan mirror and the fast-scan mirror onto the display region. At the end of the display interval, the slow-scan mirror may return from the final scanning position to the initial scanning position during a non-display interval.

The steps of the method 300 discussed below may be performed over one or more fast-scan periods of a fast-scan mirror driven by the nonlinear driver. At step 306, the method 300 may include, at a signal generator, generating a periodic electrical signal. The periodic electrical signal may have a first frequency and may be generated based on periodic electrical signal instructions received from a processor. The method 300 may further include, at step 308, transmitting the periodic electrical signal to a signal detector and a nonlinear driver. The nonlinear driver may be included in a fast-scan driver system along with a fast-scan MEMS sensor.

At step 310, the method 300 may further include amplifying the periodic electrical signal at the nonlinear driver to produce an amplified signal. The nonlinear driver may amplify the periodic electrical signal with a gain that varies as a function of the amplitude of the periodic electrical signal. The method 300 may further include, at step 312, driving the fast-scan mirror with the amplified electrical signal. The fast-scan mirror may transmit a fast-scan mirror output signal to the MEMS sensor, which may transmit a fast-scan MEMS sensor output signal to the signal detector.

At step 314, the method 300 may further include receiving the periodic electrical signal and a fast-scan MEMS sensor output signal at the signal detector. At step 316, the method 300 may further include, at the signal detector, detecting an amplitude difference between the periodic electrical signal and the fast-scan MEMS sensor output signal. For example, the periodic electrical signal may destructively interfere with the fast-scan MEMS sensor output signal at the signal detector. At step 318, the method 300 may further include transmitting the amplitude difference to a processor. Alternatively, instead of detecting the amplitude difference at a signal detector, the periodic electrical signal and the fast-scan MEMS sensor output signal may be transmitted to the processor and the amplitude difference may be determined at the processor.

At step 320, the method 300 may further include determining a driver system resonant frequency of a fast-scan driver system including the nonlinear driver and the fast-scan MEMS sensor. The driver system resonant frequency may be determined at the processor based on the amplitude difference. Step 320 may further include step 322, at which the method 300 may include determining a phase difference between the periodic electrical signal and the fast-scan MEMS sensor output signal.

Figure 13B:
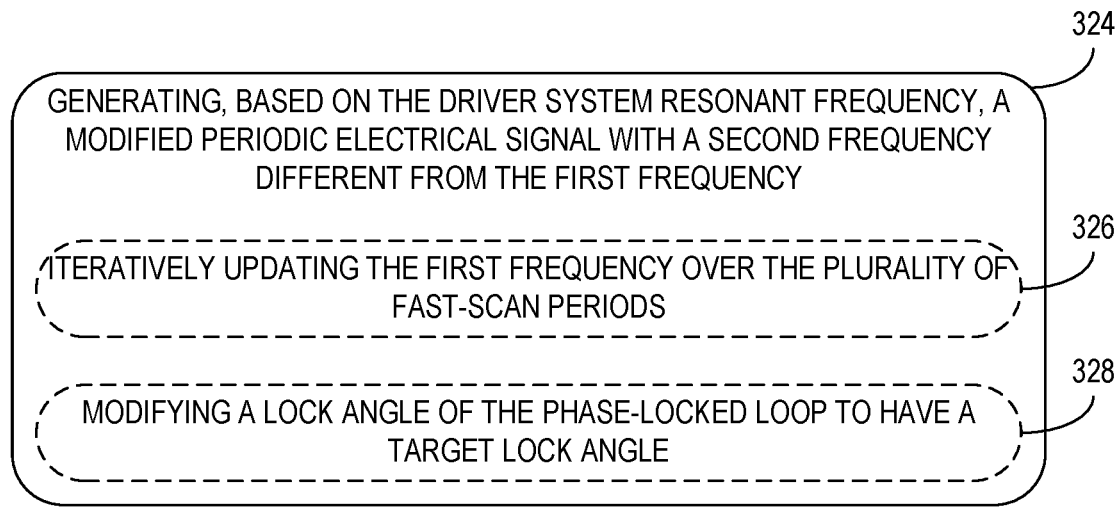
FIG. 13B shows additional steps that may optionally be performed when performing the method of FIG. 13A.

The method 300 of FIG. 13A may further include the following optional steps shown in FIG. 13B. At step 324, the method 300 may further include generating, based on the driver system resonant frequency, a modified periodic electrical signal with a second frequency different from the first frequency. In some embodiments, the second frequency may be the driver system resonant frequency. The modified periodic electrical signal may be generated based on modified periodic electrical signal instructions received from the processor. In some embodiments, generating the modified periodic electrical signal may include, at step 326, iteratively updating the first frequency over the plurality of fast-scan periods. In embodiments in which the signal generator includes a phase-locked loop, generating the modified periodic electrical signal may further include, at step 328, modifying a lock angle of the phase-locked loop to have a target lock angle.

Figure 13C:
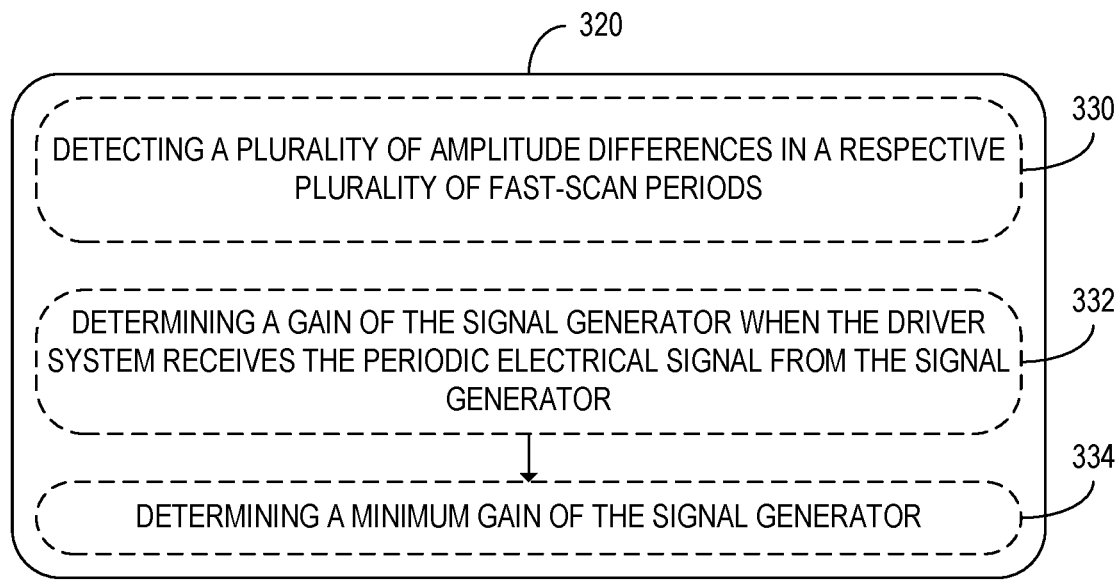
FIG. 13C shows additional steps that may optionally be performed when performing the method of FIG. 13A.

In some embodiments, determining the driver system resonant frequency at step 320 may include one of the following optional steps shown in FIG. 13C. At step 330, the method 300 may further include detecting a plurality of amplitude differences in a respective plurality of fast-scan periods. Step 330 may be performed, for example, when step 324 shown in FIG. 13B is performed. In embodiments in which the signal generator is configured to vary the output gain to maintain constant MEMS output amplitude, determining the driver system resonant frequency may include, at step 332, determining a gain over the frequency scan of the signal generator when the fast-scan driver system receives the periodic electrical signal from the signal generator. In some embodiments, at step 334, step 320 may further include determining a minimum gain of the signal generator. It will be appreciated that at resonance for the fast-scan MEMS mirror, the fast-scan MEMS mirror gain is at a maximum, and thus the driver gain of the nonlinear driver can be kept to a minimum, thereby keeping the energy consumption of the system to a minimum.

The systems and methods described above may allow the processor to dynamically update a determination of the driver system resonant frequency as the driver system resonant frequency changes over time. Thus, by generating a modified periodic electrical signal with a frequency adjusted for changes in the driver system resonant frequency, the fast-scan mirror may be driven in a manner that is energy-efficient and results in a clearly displayed image.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
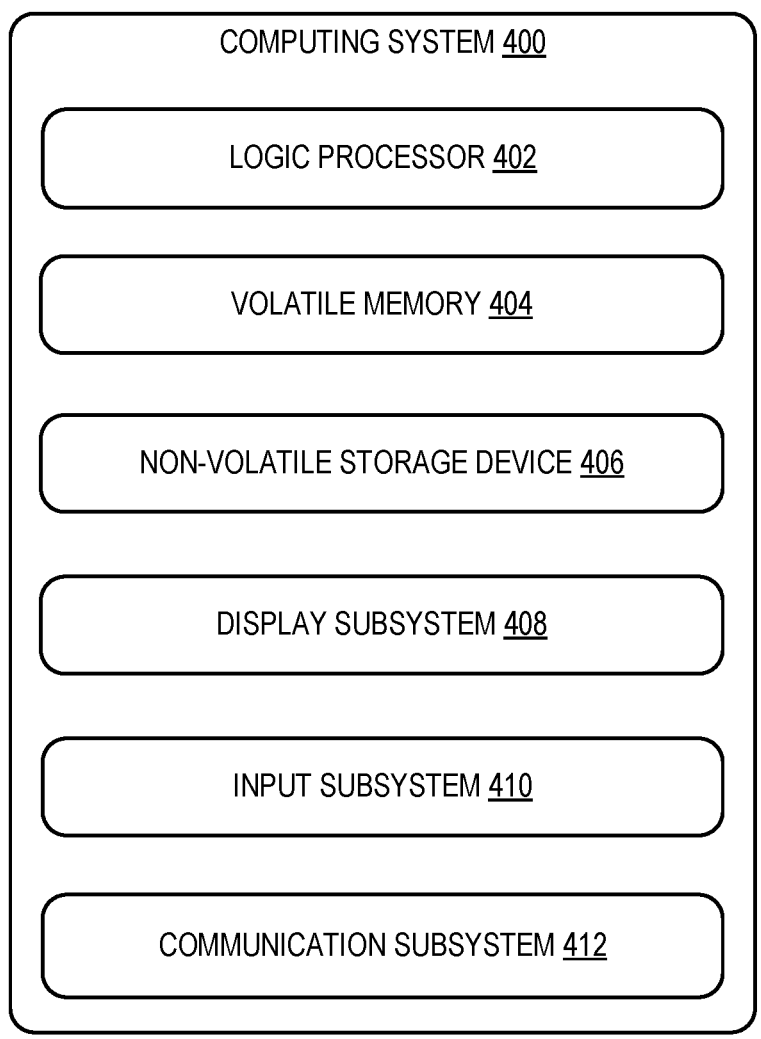
FIG. 14 shows a schematic view of an example computing environment in which the computer device may be enacted.

FIG. 14 schematically shows a non-limiting embodiment of a computing system 400 that can enact one or more of the methods and processes described above. Computing system 400 is shown in simplified form. Computing system 400 may embody the display device 10 described above and illustrated in FIG. 6. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 14.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

According to one aspect of the present disclosure, a display device is provided, including a laser beam emitter configured to emit a laser beam. The display device may further include a fast-scan driver system including a nonlinear driver and a fast-scan microelectromechanical (MEMS) sensor. The display device may further include and a slow-scan MEMS driver. The nonlinear driver and the slow-scan MEMS driver may be respectively configured to drive a fast-scan mirror and a slow-scan mirror. The slow-scan mirror and the fast-scan mirror may be configured to reflect the laser beam onto a display region. The display device may further include a signal generator configured to generate a periodic electrical signal having a first frequency in response to receiving periodic electrical signal instructions. The nonlinear driver may be configured to receive the periodic electrical signal from the signal generator. The nonlinear driver may be further configured to amplify the periodic electrical signal to produce an amplified signal. The nonlinear driver may be further configured to drive the fast-scan mirror with the amplified electrical signal. The fast-scan MEMS sensor may be configured to detect a motion of the fast-scan mirror. The display device may further include a signal detector configured to receive the periodic electrical signal from the signal generator and a fast-scan MEMS sensor output signal from the fast-scan MEMS sensor. The signal generator may be further configured to detect an amplitude difference between the periodic electrical signal and the fast-scan MEMS sensor output signal. The display device may further include a processor configured to receive the amplitude difference from the signal detector and determine, based on the amplitude difference, a driver system resonant frequency of the fast-scan driver system.

According to this aspect, the processor may be configured to determine the driver system resonant frequency at least in part by determining a phase difference between the periodic electrical signal and the fast-scan MEMS sensor output signal.

According to this aspect, the second frequency may be the driver system resonant frequency. According to this aspect, the processor may be configured to determine the driver system resonant frequency at least in part by detecting a plurality of amplitude differences in a respective plurality of fast-scan periods that occur during the non-display interval.

According to this aspect, the processor may be configured to generate the modified periodic electrical signal instructions at least in part by iteratively updating the first frequency over the plurality of fast-scan periods.

According to this aspect, the signal generator may include a phase-locked loop. According to this aspect, the processor may be configured to generate the modified periodic electrical signal instructions at least in part by modifying a lock angle of the phase-locked loop to have a target lock angle. According to this aspect, the processor may be configured to determine the driver system resonant frequency at least in part by determining a gain of the signal generator when the fast-scan driver system receives the periodic electrical signal from the signal generator. According to this aspect, during the non-display interval, the slow-scan mirror may return from a final scanning position to an initial scanning position.

According to another aspect of the present disclosure, a method for use with a display device is provided. The method may include scanning a display region with a slow-scan mirror driven by a slow-scan microelectromechanical systems (MEMS) driver. In a fast-scan period of a fast-scan mirror driven by a nonlinear driver, the method may further include, at a signal generator, generating a periodic electrical signal. The periodic electrical signal may have a first frequency. The method may further include transmitting the periodic electrical signal to a signal detector and a nonlinear driver. The method may further include amplifying the periodic electrical signal at the nonlinear driver to produce an amplified signal. The method may further include driving the fast-scan mirror with the amplified electrical signal. At the signal detector, the method may further include receiving the periodic electrical signal and a fast-scan MEMS sensor output signal, detecting an amplitude difference between the periodic electrical signal and the fast-scan MEMS sensor output signal, and transmitting the amplitude difference to a processor. At the processor, the method may further include determining, based on the amplitude difference, a driver system resonant frequency of a fast-scan driver system including the nonlinear driver.

According to this aspect, determining the driver system resonant frequency may include detecting a plurality of amplitude differences in a respective plurality of fast-scan periods that occur during the non-display interval.

According to this aspect, generating the modified periodic electrical signal may include iteratively updating the first frequency over the plurality of fast-scan periods.

According to this aspect, the signal generator may include a phase-locked loop. Generating the modified periodic electrical signal may include modifying a lock angle of the phase-locked loop to have a target lock angle. According to this aspect, determining the driver system resonant frequency may include determining a gain of the signal generator when the fast-scan driver system receives the periodic electrical signal from the signal generator. According to this aspect, scanning the display region may include reflecting a laser beam off the slow-scan mirror and the fast-scan mirror onto the display region.

According to another aspect of the present disclosure, a display device is provided, including a laser beam emitter configured to emit a laser beam. The display device may further include a fast-scan driver system including a nonlinear driver and a fast-scan microelectromechanical (MEMS) sensor. The display device may further include and a slow-scan MEMS driver. The nonlinear driver and the slow-scan MEMS driver may be respectively configured to drive a fast-scan mirror and a slow-scan mirror. The slow-scan mirror and the fast-scan mirror may be configured to reflect the laser beam onto a display region. The display device may further include a signal generator that includes a phase-locked loop and is configured to generate a periodic electrical signal having a first frequency. The nonlinear driver may be configured to receive the periodic electrical signal from the signal generator, amplify the periodic electrical signal to produce an amplified signal, and drive the fast-scan mirror with the amplified electrical signal. The fast-scan MEMS sensor may be configured to detect a motion of the fast-scan mirror. The display device may further include a signal detector configured to receive the periodic electrical signal from the signal generator and a fast-scan MEMS sensor output signal from the fast-scan MEMS sensor. The signal detector may be further configured to detect an amplitude difference between the periodic electrical signal and the fast-scan MEMS sensor output signal. The display device may further include a processor configured to receive the amplitude difference from the signal detector and determine, based on the amplitude difference, a gain of the signal generator. From the gain, the system can determine a current resonant frequency, and from the determined resonant frequency, the system can bias an input signal to the mirror to control the resonant frequency of the mirror.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. It is also understood that a "loop" or a "control loop" refers to any process, module, chipset, or any hardware or software component performing a set of operations that execute periodically. The period in which the set of operations repeat is based on a physical clock speed and/or any mechanism that controls a delay between each execution.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device comprising:
a laser beam emitter configured to emit a laser beam;
a slow-scan mirror;
a slow-scan microelectromechanical (MEMS) control;
an electrostatic MEMS fast-scan mirror; and
a fast-scan MEMS control, wherein the slow-scan MEMS control and the fast-scan MEMS control are respectively configured to drive the slow-scan mirror and the electrostatic MEMS fast-scan mirror to reflect the laser beam onto a display region to generate an image, wherein the fast-scan MEMS control comprises
a first control loop for maintaining a resonance actuation for the electrostatic MEMS fast-scan mirror,
a second control loop for maintaining an open angle for the electrostatic MEMS fast-scan mirror, and
a third control loop configured to receive a feedback signal from the electrostatic MEMS fast-scan mirror indicating a current resonant frequency of the electrostatic MEMS fast-scan mirror, wherein the third control loop adjusts a bias of a driving signal to the fast-scan mirror to reduce an error between a target resonant frequency and the current resonant frequency, wherein the current resonant frequency is based on a detected phase of the feedback signal, and wherein the bias of the driving signal is raised or lowered based on the current resonant frequency to correct for phase aliasing that results the from the electrostatic MEMS fast-scan mirror and the fast-scan MEMS control.

2. The display device of claim 1, wherein the driving signal comprises a bias voltage, wherein the bias voltage is adjusted when the current resonant frequency is below the target resonant frequency.

3. The display device of claim 1, wherein the driving signal comprises a bias voltage, wherein the bias voltage is adjusted when the current resonant frequency is above the target resonant frequency.

4. The display device of claim 1, wherein the driving signal comprises a bias voltage, wherein the bias voltage has an initial positive DC voltage, wherein the bias voltage is decreased when the current resonant frequency is below the target resonant frequency.

5. The display device of claim 1, wherein the driving signal comprises a negative bias voltage when the current resonant frequency is above the target resonant frequency.

6. The display device of claim 1, wherein the first control loop maintains resonance actuation for the electrostatic MEMS fast-scan mirror independently without an input signal from the third control loop.

7. The display device of claim 1, wherein the second control loop maintains the open angle for the electrostatic MEMS fast-scan mirror independently without an input signal from the third control loop.

8. The display device of claim 1, wherein the slow-scan MEMS control controls the slow-scan mirror based on a frame rate of input data and a fixed fast-scan mirror resonant frequency independently without the feedback signal indicating the current resonant frequency.

9. The display device of claim 1, wherein the driving signal comprises a bias voltage, wherein the bias voltage has an initial negative DC voltage, wherein the amplitude of the bias voltage is increased when the current resonant frequency is above the target resonant frequency.

* * * * *